United States Patent [19]

van den Avoort et al.

[11] Patent Number: 4,480,267

[45] Date of Patent: Oct. 30, 1984

[54] LINE STANDARD CONVERSION CIRCUIT

[75] Inventors: Pieter M. van den Avoort; Marinus C. W. van Buul, both of Eindhoven, Netherlands

[73] Assignee: U.S. Philips Corporation, New York, N.Y.

[21] Appl. No.: 417,783

[22] Filed: Sep. 13, 1982

Related U.S. Application Data

[63] Continuation of Ser. No. 126,058, Feb. 29, 1980, abandoned, which is a continuation of Ser. No. 909,351, May 25, 1978, abandoned.

[30] Foreign Application Priority Data

May 25, 1978 [NL] Netherlands .......................... 7706512

[51] Int. Cl.³ ............................................... H04N 5/02
[52] U.S. Cl. ................................................. 358/140
[58] Field of Search .................................. 358/11, 140

[56] References Cited

FOREIGN PATENT DOCUMENTS 1019811 2/1966 United Kingdom ................ 358/140
1326386 8/1973 United Kingdom ................ 358/140

OTHER PUBLICATIONS van Buul–Stds. Conversion of A Videophone Signal with 313 Lines Into A TV Signal with 625 Lines–-Philips Research Report–Vol. 29, #5, pp. 413–428, Oct. 1974.

Primary Examiner—Joseph A. Orsino, Jr.
Attorney, Agent, or Firm—Thomas A. Briody; William J. Streeter; Edward W. Goodman

[57] ABSTRACT

The use of a field interpolation circuit which interpolates by means of equal amplitudes of the information from two successive fields results in a television line standard doubler capable of furnishing a very good picture quality.

4 Claims, 6 Drawing Figures

LINE STANDARD CONVERSION CIRCUIT

This is a continuation of application Ser. No. 126,058, filed Feb. 29, 1980; abandoned, which is a continuation of application Ser. No. 909,351, filed May 25, 1978, now abandoned.

BACKGROUND OF THE INVENTION

The invention relates to a line standard conversion circuit for converting an interlaced television signal having a given number of lines per picture into a converted television signal having substantially double the number of lines per picture while maintaining the field frequency, the conversion circuit comprising a converter and an interpolator.

Philips Research Reports 29, 1974, pages 413-428 discloses a line standard conversion circuit of the above-mentioned type in which the converter converts the signal relating to the lines of a 313-line television picture into a signal relating to the lines of a 625-line television picture. Because the converter can supply information for only every alternate line of the 625-line picture, it is followed by an interpolator which, by means of one or more line stores, adds the missing lines in the 625-line picture and composes the signals of the lines of the 625-line picture from the signals of different lines of the 313-line picture.

SUMMARY OF THE INVENTION

It is an object of the invention to improve the picture quality obtainable with the converted television signal.

A line standard conversion circuit of the type mentioned in the preamble in accordance with the invention is therefore characterized in that the interpolator has a field interpolation circuit for obtaining practically equal amplitudes of the information from each of two successive fields of the television signal to be converted in the lines of the converted television signal.

The invention is based on the recognition that with an interpolation between two adjoining lines of the picture image, which consequently belong to successive fields, an improved vertical resolution can be obtained compared with a hitherto customary interpolation between two time-sequential lines which are part of the same field.

A field interpolation, which utilizes equal amplitutes of the information from two successive fields in each line of the converted television signal, furthermore appears to reduce disturbing effects which are the result of motions in the picture.

It should be noted that the use of a field store for line number doubling is known from Radio Mentor Electronic 1975 No. 5, pages 194-196. This field store is put out of operation when motions occur in the picture. In that publication averaging by means of the field store is not used. In the circuit of that publication, motions in the picture are detected by means of a picture store.

In addition it should be noted that averaging information from two successive fields with converters wherein the picture or field frequency is changed is known from the Royal Television Society Journal September/October 1974 pages 140-159. Averaging is necessary there to prevent speed differences, caused by the picture frequency difference, from occurring in motions in pictures obtained from the converted television signal relative to those in pictures obtained from the television signals to be converted. These phenomena do not occur with converters which are the subject of the application because there is no question of changing the picture or field frequency.

DESCRIPTION OF THE DRAWINGS

The invention will now be further explained with reference to the drawings.

In the drawings

DESCRIPTION OF THE PREFERRED EMBODIMENTS

Figure 1:
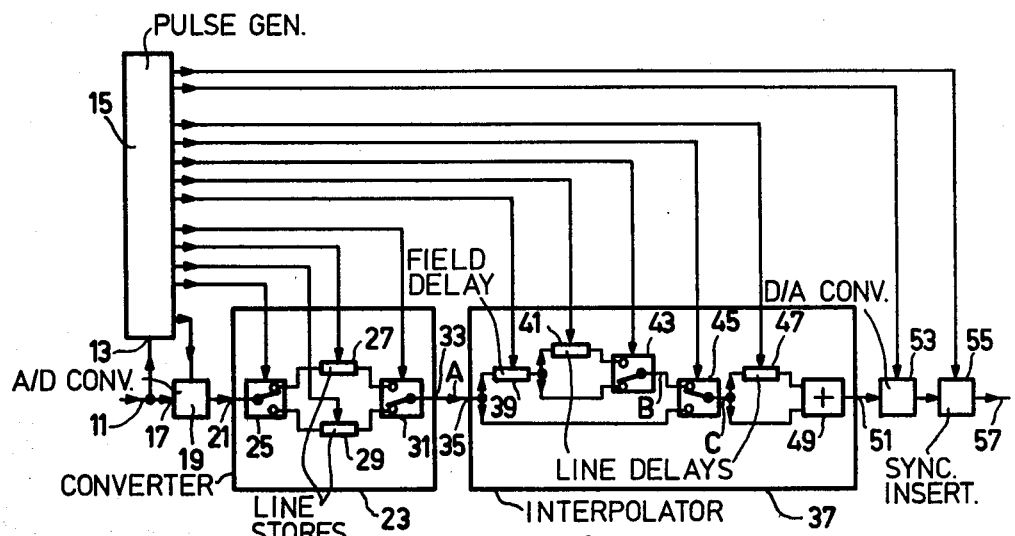
FIG. 1 illustrates, by means of a concise block diagram, a line standard conversion circuit according to the invention.

In FIG. 1 a television signal to be converted relating an interlaced television picture having 313 lines and 50 fields per second, is applied to an input 11. Via an input 13, this signal arrives at a pulse generator 15 which separates the synchronizing signals from the incoming television signal and processes it into new synchronizing signals, and which supplies signals for operating different portions of the circuit.

The television signal to be converted is furthermore applied to an input 17 of an anlog-to-digital converter 19 which supplies a digitized, for example pulse-code modulated, television signal to an input 21 of a converter 23. The analog-to-digital converter 19 is controlled by a signal from the pulse generator 15.

The converter 23 comprises a first change-over switch 25, two line stores 27, 29 and a second change-over switch 31, which are all controlled by signals from the pulse generator 15. If a line of the 313-line television signal is written into one of the line stores, for example 27, a signal is applied from the other line store 29 to an output 33 at substantially double the speed, so that it fits into a 625-line television picture. A following line period of the 313-line television signal is then written into the line store 29 and the line store 27 is read.

Figure 2:
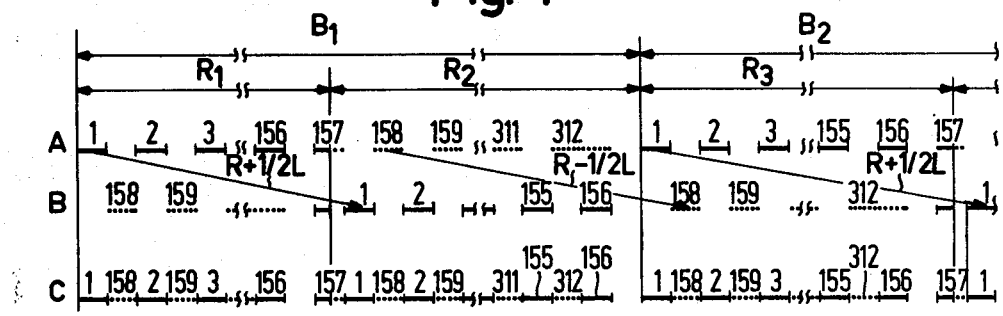
FIG. 2 illustrates, with reference to a time diagram, a survey of the information current in some points of the diagram, of FIG. 1.

FIG. 2A shows schematically how the information appearing at the output 33 of the converter 23 varies. In a first field $R_1$ of the 625-line picture, signals are successively supplied every alternate line period which signals contain information from the original lines 1, 2, 3 ... of the 313-line television signal to be converted, while in the second field $R_2$, signals originating from the lines 157, 158, 159 ... are supplied. These line numbers are indicated in FIG. 2. The first and the second field $R_1$, $R_2$ together form the first picture $B_1$ and the second picture $B_2$ starts with the third field $R_3$.

Such a conversion is known from the German Offenlegungsschrift No. 2 243 121 (PHN 5876), which corresponds to U.S. Pat. No. 3,830,971, issued Aug. 20, 1974, and is therefore not described in detail.

The output signal of the converter 23 is applied to an input 35 of an interpolator 37 which is a field interpolation circuit and which comprises, connected to the input 35, a field delay line 39 having a delay time of a field period R less half a line period $\frac{1}{2}L$ so $(R-\frac{1}{2}L)$. This is an integral number of line periods of the 625-line picture. This field delay line 39 is followed by a line delay line 41 having a delay time of a line period L. Under the influence of a signal from the pulse generator 15 this line delay line is switched off every alternate field by a switch 43. The output signal of the switch 43 shown symbolically in FIG. 2B is applied to a change-over switch 45, which is further supplied with a signal from the input 35 of the interpolator 57, and which supplies at its output alternatingly a delayed and a non-delayed signal, as shown in FIG. 2C. Due to the operation of the switch 43, the output signal of the switch 43 is delayed in the second field $R_2$ for a period of $(R+\frac{1}{2}L)$, in the third field $R_3$ for a period of $(R-\frac{1}{2}L)$, and so on. As a result, the same sequence of information is obtained in all pictures, as is evident from FIG. 2C. The change-over sequence of the change-over switch 45 is reversed at the end of each picture. That is to say that then, for once, a delayed or a non-delayed signal is pressed by the change-over switch 45 in two successive line periods. This reversal is necessary since, due to an irregularity in the conversion at the end of a picture, a reversal of the information-no-information sequence occurs at the output of the converter 23. At the field change $R_1$, $R_2$ and $R_3$, this reversal is cancelled by switching the line delay line 41 off or on, respectively by means of the change-over switch 43.

As appears from FIG. 2c, information originating from a line of one field and from an adjoining line of the other field is alternately available at the output of the switch 45. By means of a line averaging circuit comprising a line delay line 47, and an adder circuit 49, which adds the input and the output signal of the line delay line 47 a signal is obtained at an output 51 of the interpolator 37 which contains each time the same quantity of information from two adjoining lines of two time-sequential fields. This signal is applied via a digital-to-analog converter 53 and a synchronization-signal insertion circuit 55 to an output 57 of the conversion circuit.

The delay circuits 39, 41 and 47 may be shift registers controlled by means of the pulse generator 15. The digital-to-analog converter 53 is also controlled by the pulse generator 15. A new synchronizing signal obtained from the pulse generator 15, is inserted by the synchronisation signal insertion circuit 55 into the converted television signal.

The switches 43 and 45, which act as combining circuits may, if so desired, be replaced by an adding circuit if no noise signals occur in the line periods in which no information is present.

Figure 3:
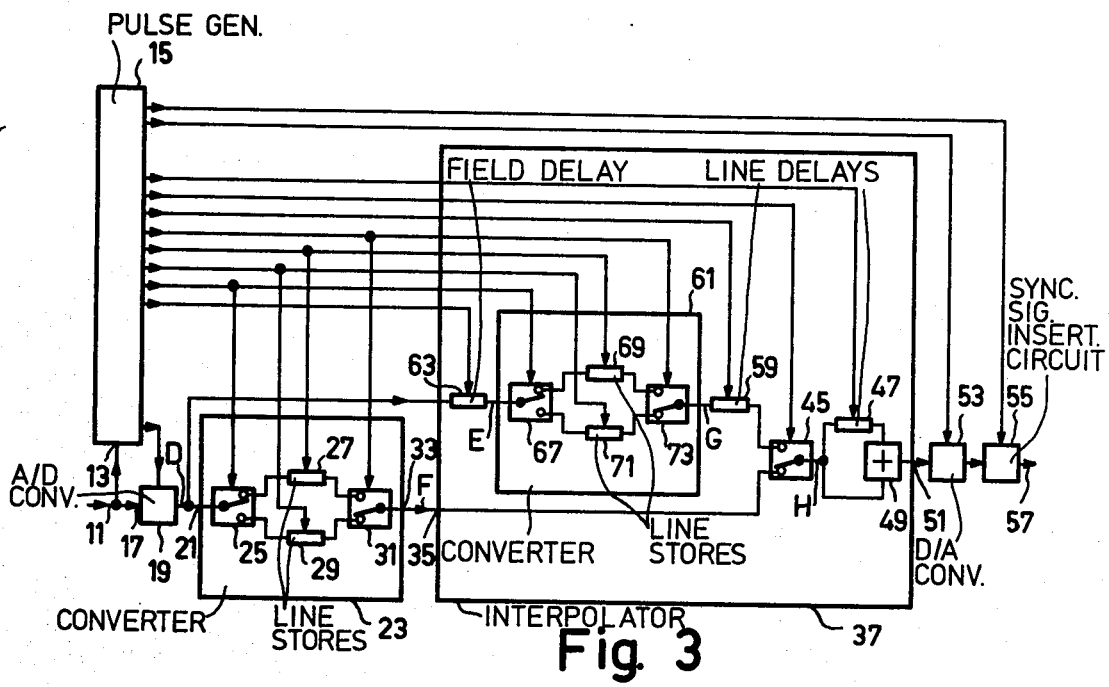
FIG. 3 illustrates, by means of a concise block diagram a further possible embodiment of a line standard conversion circuit according to the invention.

Elements in FIG. 3 which correspond to elements in FIG. 1 have been given the same reference numerals. For their description reference is made to FIG. 1.

The conversion circuit of FIG. 3 differs from that in FIG. 1 in that the input of the change-over switch 45 not connected to the input 35 of the interpolator 37 is connected via a line delay line 59, a further converter 61 and a field delay line 63 to the input 21 of the conversion circuit 23.

The additional converter 61 comprises, starting from its input, a change-over switch 67, a line store 69, a line store 71 and a change-over switch 73. The change-over switches 67, 73 are synchronous with the change-over switches 25, 31 of the converter 23 and the line stores 69, 71 are controlled synchronously with the line stores 27, 29 of the converter 23. The delay time of the field delay line 63 is half a line period shorter than the field period. This half-line period is half a line period of the television signal to be converted.

Figure 4:
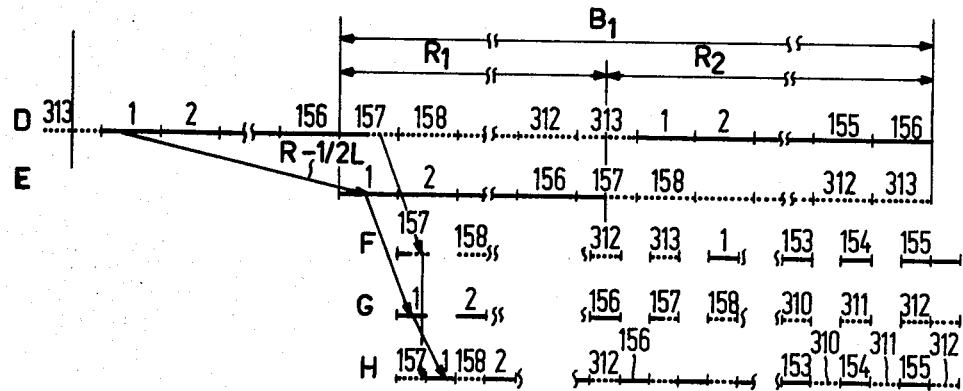
FIG. 4 illustrates, by means of a time diagram, the information current in some points of the diagram of FIG. 3.

The information current diagram at the input 21 of the converter 23 is shown in FIG. 4D. FIG. 4E shows the diagram at the output of the field store 63. In this FIG. 4, the numbers at the time periods are the line numbers of the television signal to be converted from which the relevant information derives. The lines are numbered time-sequentially.

The converter 23 starts a conversion cycle with line number 1 and the converter 61 with line number 157. A conversion cycle includes two fields $R_1$ and $R_2$, i.e. one picture $B_1$.

The output signal of the converter 23 is shown schematically in FIG. 4F and that of the converter 61 in FIG. 4G. The output signal of the change-over switch 45 is shown schematically in FIG. 4H. Also here the change-over switch 45 has a change in sequence at each change in the picture.

FIG. 4H shows that at the output of the change-over switch 45, a picture line from one field and from the next field are alternately available. These picture lines are time-sequential such as they occurred in positional sequence in the picture belonging to the television signal to be converted. A signal, each picture line of which comprises the same amplitude of the information from two adjoining lines of successive fields, appears again at the output 51 of the interpolator.

Figure 5:
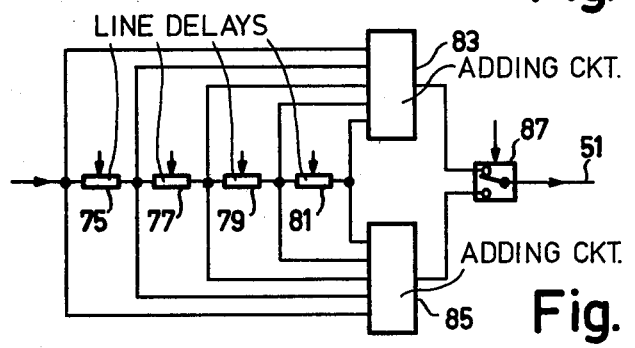
FIG. 5 illustrates by means of a concise block diagram, a portion of an interpolation circuit for a line standard converter shown in FIG. 3.

FIG. 5 shows how a field interpolation circuit can be combined with a line interpolation circuit to obtain a further improvement in the quality of the television picture which can be displayed by means of the converted television signal. Instead of a line averaging circuit 47, 49, a series arrangement of four line delay lines 75, 77, 79, 81 are included at the output of the change-over switch 45 of FIG. 3, whose inputs and outputs are connected to two adding circuits 83, 85, the outputs of which are connected to the output 51 via a change-over switch 87. The change-over switch 87 assumes a different position for each subsequent field.

In the adding circuits 83 and 85 adding of the input signals is performed from the top to the bottom in the ratio $(-1):(0):(12):(8):(-3)$. If a signal from the field $R_1$ is connected to the input of the delay line 75, a signal from the field $R_2$ is connected to the input of the delay line 77, a signal from the field $R_1$ to that of the delay line 79, a signal from the field $R_2$ to the input of the delay line 81, and a signal from the field $R_1$ to its output. These signals originate from adjoining lines from two fields and are time-sequential for each field. With the given ratio an amplitude of the information $(-1+12-3)=8$ comes from the field $R_1$, and a amplitude $(0+8)=8$ comes from the field $R_2$ at the output of the adding circuit 83. These amplitudes are equal whereas, due to the choice of the ratios, a position interpolation is yet achieved. In the next field the adding circuit 85 is active and the sequence of the ratios is reversed for a correct position interpolation but the same amplitude of information is nevertheless obtained from each field at the output.

The delay lines 75, 77, 79, 81 and the change-over switch 87 are again controlled by the pulse generator 15.

Figure 6:
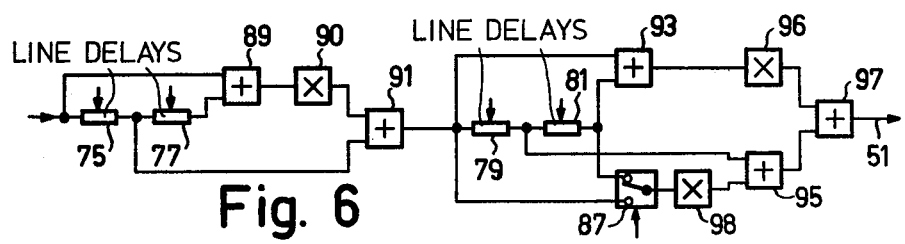
FIG. 6 shows, by means of a block diagram, a possible embodiment of an interpolation circuit of FIG. 5.

The above-mentioned ratios which form a favourable combination can be obtained in a simple manner by means of a circuit, shown in FIG. 6, which is suitable for processing pulse current modulated signals.

Instead of two adding circuits, a number of adding circuits 89, 91, 93, 95 and 97 are disposed here and the change-over switch 87 is positioned differently. The input signal of the delay line 75 and the output signal of the delay line 77 are added in a ratio (1:1) by the adding circuit 89, thereafter multiplied by means of a circuit 90 by a factor $(-\frac{1}{8})$ and applied to the adding circuit 91. The output signal of the delay line 75 is applied to the other input of the adding circuit 91. The adding circuit 91 adds with a ratio (1:1) and supplies its output signal to an input of the adding circuit 93, the delay line 79 and the change-over switch 87. The other input of the adding circuit 93 is connected to the output of the delay line 81. The signals at the inputs of the adding circuit 93 are added in a ratio (1:1) and are applied via a circuit 96, which multiplies by a factor $(\frac{1}{4})$ to, an input of the adding circuit 97, which receives at its other input the output signal of the adding circuit 95 and which adds the signals in the ratio (1:1). The adding circuit 95 receives at an input the output signal of the delay line 79 and at its other input, via a circuit 98 which multiplies by a factor $\frac{1}{2}$, the output signal of the change-over switch 87 and adds these signals in the ratio (1:1). The further input of the change-over switch 87 is connected to the output of the delay line 81.

The ratios used in this circuit are powers of two and can be realized by a relative shift in the bit positions of the code words in the pulse code. A sign reversal is performed in accordance with the so-called Two's Complement Method, All bits are inverted and the carry-input of the next adder is made 1.

Although the above describes an inversion from 313 to 625 lines as being suitable for converting a video telephone signal into a broadcast television signal, it is of course possible to convert, by means of a field interpolation circuit according to the invention, a broadcast television signal of 625 lines into a television signal of, for example, 1249, 1250 or 1251 lines which results in a very high picture quality. Furthermore, conversions of a line number n to 2n or a slightly deviating value can be performed at will if the converter and the delay time of the field delay lines are modified.

With a conversion from n to 2n, the switches 31 and 43 must be omitted and the delay time of the delay circuit 39, which must be an odd number of line periods, then becomes a field period R. The change-over switch 87 can then be dispensed with in the circuit of FIG. 5 and only three delay lines and one adding circuit need to be used which then has four inputs and adds in a ratio $(-\frac{1}{8}):(\frac{5}{8}):(\frac{5}{8}):(-\frac{1}{8})$.

The ratio of the highest negative factor to the highest positive factor in the adding circuit must preferably be approximately $(-1):(4)$ to $(-1):(5)$ to obtain the best picture quality.

It will be obvious that the number of line delay lines used for averaging can also be chosen differently than in the examples given here.

What is claimed is:

1. A line standard conversion circuit for converting an interlaced television signal having a given number of lines per picture into a converted television signal having substantially double the number of lines per picture while maintaining the field frequency, said conversion circuit having a converter and a field interpolation circuit coupled to the converter for obtaining practically equal amplitudes of the information from each of two successive fields of the television signal to be converted into each of the lines of the converted television signal, wherein said field interpolation circuit includes a line averaging circuit which comprises a circuit for combining the sum of the amplitudes of the information from consecutive lines in one field with the sum of the amplitudes of the information from consecutive lines in a successive field which lines would interlace with said lines from said one field, the summed amplitude of the information from said one field being substantially equal to the summed amplitude of the information from said successive field, wherein the amplitude values of the signals of different lines in a first field are made to contribute to the sum in a first fixed ratio while the amplitude values of the signals of different lines in a second field are made to contribute to the sum in a second and different fixed ratio, the sum of the coefficients in said first fixed ratio being equal to the sum of the coefficients in said second fixed ratio.

2. A line standard conversion circuit as claimed in claim 1 wherein in a first field period, a first, third and fifth line from said first field contribute in said first fixed ratio and a second and fourth line of said second field contribute in said second fixed ratio and wherein in a next field period, a first, third and fifth line of the second field contribute in a reverse sequence of the first fixed ratio while a second and fourth line of a third field contribute in a reverse sequence of the second fixed ratio.

3. A line standard conversion circuit as claimed in claim 2, wherein said first fixed ratio is $(-1):(12):(-3)$ and said second fixed ratio is $(0):(8)$.

4. A line standard conversion circuit as claimed in claims 2 or 3 wherein said field interpolation circuit further comprises a field delay circuit, a line delay circuit and a combining circuit, an output and an input of the field delay circuit along with an output of the line delay circuit each being coupled to an input of the combining circuit, an output of the combining circuit being coupled to an input of the line averaging circuit.

* * * * *

UNITED STATES PATENT AND TRADEMARK OFFICE
CERTIFICATE OF CORRECTION

PATENT NO. : 4,480,267
DATED : Oct. 30, 1984
INVENTOR(S) : PIETER M. VAN DEN AVOORT ET AL

It is certified that error appears in the above-identified patent and that said Letters Patent is hereby corrected as shown below:

TITLE PAGE ITEM [30]

Change date of Priority application from "May 25, 1978" to --June 14, 1977--.

Signed and Sealed this

Twenty-third Day of April 1985

[SEAL]

Attest:

DONALD J. QUIGG

*Attesting Officer*  *Acting Commissioner of Patents and Trademarks*